US010836418B2

(12) United States Patent
Zhu et al.

(10) Patent No.: US 10,836,418 B2
(45) Date of Patent: Nov. 17, 2020

(54) FOLDABLE HANDCART

(71) Applicant: ZHEJIANG SUNSHINE LEISURE PRODUCTS CO., LTD., Jinhua (CN)

(72) Inventors: Xiaohui Zhu, Jinhua (CN); Xuefeng Zheng, Jinhua (CN)

(73) Assignee: ZHEJIANG SUNSHINE LEISURE PRODUCTS CO., LTD., Jinhua ( * ) Notice: Subject to any disclaimer, the term of this patent is extended or adjusted under 35 U.S.C. 154(b) by 0 days.

(21) Appl. No.: 16/266,957

(22) Filed: Feb. 4, 2019

(65) Prior Publication Data

US 2020/0189638 A1 Jun. 18, 2020

(30) Foreign Application Priority Data

Dec. 18, 2018 (CN) .................... 2018 2 2130689 U

(51) Int. Cl.
*B62B 3/00* (2006.01)
*B62B 3/02* (2006.01)

(52) U.S. Cl.
CPC .............. *B62B 3/025* (2013.01); *B62B 3/002* (2013.01); *B62B 2205/02* (2013.01); *B62B 2205/06* (2013.01)

(58) Field of Classification Search
CPC ........... B62B 3/02; B62B 3/002; B62B 3/025; B62B 7/008; B62B 3/007
See application file for complete search history.

(56) References Cited

U.S. PATENT DOCUMENTS 6,491,318 B1 * 12/2002 Galt .......................... B62B 3/02 280/42
9,073,564 B2 * 7/2015 Yang ......................... B62B 3/02
9,327,749 B2 * 5/2016 Young ..................... B62B 7/008
9,738,298 B1 * 8/2017 Yang ....................... B62B 3/025
9,969,227 B1 * 5/2018 McNeave ............. B60F 3/0069
10,272,937 B2 * 4/2019 Chen ....................... B62B 3/025
2010/0090444 A1 * 4/2010 Chen ....................... B62B 3/007 280/651
2010/0156069 A1 * 6/2010 Chen ....................... B62B 3/007 280/639

(Continued)

FOREIGN PATENT DOCUMENTS

CN 103895672 A 7/2014

*Primary Examiner* — Hau V Phan
(74) *Attorney, Agent, or Firm* — Muncy, Geissler, Olds & Lowe, P.C.

(57) ABSTRACT

A foldable handcart comprises a handcart frame comprising a bottom frame, a front frame, a rear frame and side frames. The bottom frame comprises two longitudinal beams and a supporting beam arranged in-between. Each longitudinal beam has two ends separately pivoted to the front and rear frames and comprises a front longitudinal beam part and a rear longitudinal beam part, which are pivoted to two ends of a longitudinal beam limiting part and can be folded downwards or be limited upwards to form the linear longitudinal beam. Each side frame comprises two first oblique beams having first ends pivoted together and second ends separately pivoted to the front and rear frames. In the unfolded state, each front longitudinal beam part and the corresponding rear longitudinal beam part form one linear longitudinal beam and form a triangular supporting structure together with the two first oblique beams of the corresponding side frame.

8 Claims, 5 Drawing Sheets

(56) References Cited

U.S. PATENT DOCUMENTS

| | | | | |
|---|---|---|---|---|
| 2014/0353945 | A1* | 12/2014 | Young | B62B 3/007 280/650 |
| 2016/0023674 | A1* | 1/2016 | Nolan | B62B 3/007 280/651 |
| 2017/0259838 | A1* | 9/2017 | Choi | B62B 3/025 |
| 2018/0327011 | A1* | 11/2018 | Horowitz | B62B 3/02 |

* cited by examiner

FOLDABLE HANDCART

BACKGROUND OF THE INVENTION

Technical Field

The invention relates to the field of structural design of carts, in particular to a foldable handcart having good supporting stability.

Description of Related Art

Nowadays, handcarts are usually used by people to transport small batches of goods. Traditional handcarts cannot be folded or still are large in size after being folded, thereby being inconvenient to store.

Chinese Invention Patent Application No. CN201210572499.4 discloses a beach cart comprising a cart frame, a handlebar and wheels, wherein the cart frame comprises a bottom frame, a front frame, a rear frame and two side frames; the two side frames are symmetrical with respect to the bottom frame and each comprise at least two X-shaped assemblies which are symmetrically arranged side-by-side and a plurality of hinge joints used for connecting every two adjacent X-shaped assemblies on the same side; each X-shaped assembly comprises a first oblique beam and a second oblique beam which are hinged together through a hinge shaft in the middle of the X-shaped assembly; one end of each first oblique beam or each second oblique beam is hinged to the first oblique beam or the second oblique beam of the adjacent X-shaped assembly through the corresponding hinge joint, and the other end of each first oblique beam or each second oblique beam is hinged to the front beam or the rear frame through a lower support of the bottom frame or is hinged to the first oblique beam or the second oblique beam of the adjacent X-shaped assembly through the corresponding hinge joint. The beach cart has a small size after being folded and has a simple connection structure, so that the probability that the beach cart breaks down in use is lowered. However, the beach cart of such structure has the following problems: due to the fact that the part between the at least two symmetrical X-shaped assemblies of each side frame is suspended, the beach cart is poor in bearing capacity and instable in supporting.

BRIEF SUMMARY OF THE INVENTION

In view of this, the objective of the invention is to provide a foldable handcart having good supporting stability.

The technical solution adopted by the invention to fulfill the above objective is as follows:

A foldable handcart comprises a handcart frame and wheels arranged at the bottom of the handcart frame, wherein the handcart frame comprises a bottom frame, a front frame, a rear frame and side frames located on two sides.

The bottom frame comprises two longitudinal beams and a supporting beam arranged between the two longitudinal beams. Each longitudinal beam has two ends separately pivoted to the front frame and the rear frame and comprises a front longitudinal beam part and a rear longitudinal beam part which are pivoted to two ends of a longitudinal beam limiting part, wherein the front longitudinal beam part and the rear longitudinal beam part can be folded downwards relative to the longitudinal beam limiting part or be limited upwards to form the linear longitudinal beam.

Each side frame comprises two first oblique beams, wherein first ends of the two first oblique beams are pivoted together, and second ends of the two first oblique beams are separately pivoted to the front frame and the rear frame. The two longitudinal beams of the bottom frame correspond to the two side frames. In the unfolded state, each front longitudinal beam part and the corresponding rear longitudinal beam part form one linear longitudinal beam and form a triangular supporting structure together with the two first oblique beams of the corresponding side frame.

Furthermore, each longitudinal beam limiting part is provided with a U-shaped groove, wherein the U-shaped groove comprises a front opening and side openings, and the front opening of the U-shaped groove faces downwards. The front longitudinal beam part and the rear longitudinal beam part of each longitudinal beam are inserted into the corresponding U-shaped groove from the side openings of the U-shaped groove so as to be pivoted together.

Furthermore, each side frame further comprises two oblique connecting beams, wherein the two oblique connecting beams are connected between the front frame and the corresponding first oblique beam as well as between the rear frame and the corresponding first oblique beam.

Furthermore, first ends of the two first oblique beams of each side frame are pivoted to a first connecting piece so as to be pivoted together.

Furthermore, the front frame, the rear frame and the supporting beam of the bottom frame are foldable in the side direction.

Furthermore, the supporting beam is a cross beam, wherein the cross beam comprises a first cross beam part and a second cross beam part which are pivoted to two ends of a cross beam limiting part, the first cross beam part and the second cross beam part can be folded downwards relative to the cross beam limiting part or be limited upwards to form the linear cross beam, and a tail end of the first cross beam part and a tail end of the second cross beam part are pivoted to the longitudinal beam limiting parts of the two longitudinal beams.

Furthermore, the cross beam limiting part is provided with a U-shaped groove, wherein the U-shaped groove is provided with a front opening and side openings, the front opening of the U-shaped groove faces downwards, and the first cross beam part and the second cross beam part are inserted into the U-shaped groove from the side openings so as to be pivoted together.

Furthermore, the front frame and the rear frame each comprise two spaced upright columns and a telescopic connecting frame arranged between the two upright columns, wherein the upright columns of the front frame are in one-to-one correspondence of the upright columns of the rear frame, and the two side frames and the two longitudinal beams of the bottom frame are separately pivoted to the corresponding upright columns of the front frame and the rear frame.

Furthermore, each telescopic connecting frame is an X-shaped telescopic frame and comprises two second oblique beams, wherein the middles of the two second oblique beams are pivoted together. The upright columns are of a telescopic structure. The four ends of each X-shaped telescopic frame are separately connected to the upper ends and the lower ends of the two upright columns of the front frame or the rear frame.

Furthermore, each side frame further comprises two linkage beams, wherein the two linkage beams are connected between the corresponding longitudinal beam and the upper end of one upright column of the front frame as well as between the corresponding longitudinal beam and the upper end of one upright column of the rear frame.

Furthermore, each upright column comprises a supporting tube and a telescopic tube telescopically arranged in the supporting tube in a sleeved manner.

Furthermore, upper connectors are connected to the upper ends of the upright columns, lower connectors are connected to the lower ends of the upright columns, and the upright columns are correspondingly connected with the telescopic connecting frames, the side frames and the bottom frame through the upper connectors and the lower connectors.

Furthermore, the foldable handcart further comprises a handlebar arranged on the handcart frame.

By adoption of the above technical solution, the invention has the following beneficial effects:

In the unfolded state, each longitudinal beam and the two first oblique beams of the corresponding side frame form a triangular supporting structure having a good supporting effect, so that the foldable handcart is better in bearing capacity and good in supporting stability.

DETAILED DESCRIPTION OF THE INVENTION

Figure 1:
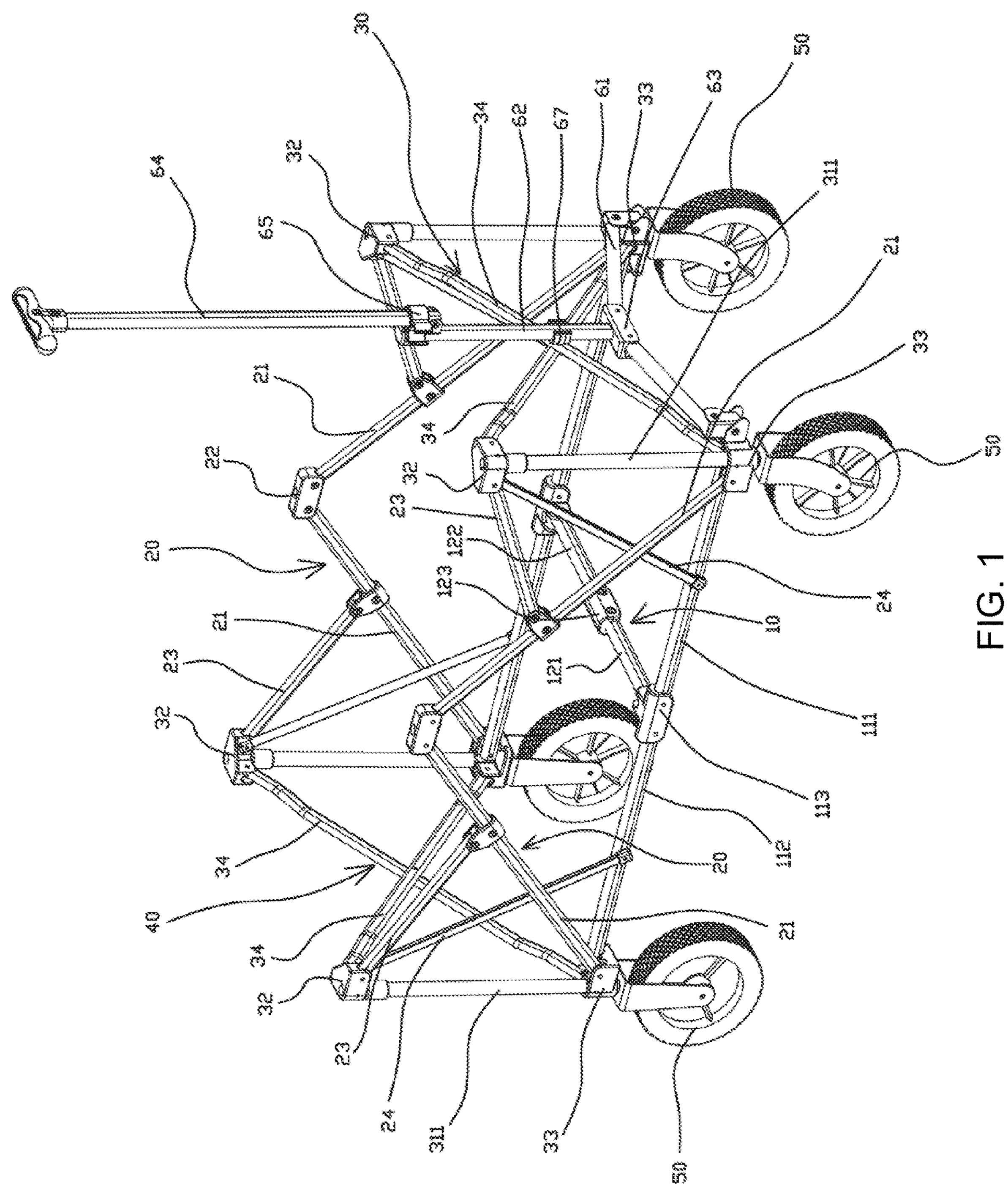
FIG. 1 is a first perspective view of a foldable handcart in the unfolded state of the embodiment.

The accompanying drawings are provided to further illustrate embodiments of the invention. These accompanying drawings are part of the contents of the invention and are mainly used to illustrate the embodiments and to explain the operating principle of the embodiments in cooperation with relevant description in the specification. By referring to these contents, those skilled in this field can understand other possible embodiments and advantages of the invention. The components in the drawings are drawn not in scale, and similar reference signs represent similar components.

The invention is further explained below with reference to the accompanying drawings and specific embodiments.

As shown in FIGS. 1-5, this embodiment provides a foldable handcart. The foldable handcart comprises a handcart frame, a handlebar arranged on the handcart frame and wheels 50 arranged at the bottom of the handcart frame. The handcart frame comprises a bottom frame 10, a front frame 30, a rear frame 40 and side frames 20 located on two sides, wherein:

The bottom frame 10 comprises two longitudinal beams and a supporting beam arranged between the two longitudinal beams. Each longitudinal beam has two ends separately pivoted to the front beam 30 and the rear frame 40 and comprises a front longitudinal beam part 111 and a rear longitudinal beam part 112 which are separately pivoted to two ends of a longitudinal beam limiting part 113, wherein the front longitudinal beam part 111 and the rear longitudinal beam part 112 can be folded downwards relative to the longitudinal beam limiting part 113 or be limited upwards to form the linear longitudinal beam. Furthermore, each longitudinal beam limiting part 113 is provided with a U-shaped groove (not shown) comprising a front opening and side openings, wherein the front opening of the U-shaped groove faces downwards. The front longitudinal beam part 111 and the rear longitudinal beam part 112 of each longitudinal beam are inserted into the corresponding U-shaped groove from the side openings of the U-shaped groove so as to be pivoted.

Each side frame 20 comprises two first oblique beams 21, wherein each first oblique beam 21 has a first end and a second end, the first ends of the two first oblique beams 21 are pivoted together, and the second ends of the two first oblique beams 21 are separately pivoted to the front frame 30 and the rear frame 40. The two longitudinal beams of the bottom frame 10 correspond to the two side frames 20. In the unfolded state, each front longitudinal beam part and the corresponding rear longitudinal beam part form one linear longitudinal beam and form a triangular supporting structure together with the two first oblique beams of the corresponding side frame. The triangular supporting structures have a good supporting effect, so that the foldable handcart is better in bearing capacity and good in supporting stability.

Particularly, in this embodiment, the first ends of the two first oblique beams 21 of each side frame are pivoted to a first connecting piece 22 so as to be pivoted together. The first connecting piece 22 is used for pivoting the first ends of the two first oblique beams 21 of each side frame, and the first ends of the two first oblique beams 21 are hidden in the connecting piece 22 and are prevented from being exposed, so that mutual interference between the first ends of the first oblique beams 21 and a cloth bag to be disposed around the foldable handcart in the subsequent stage is avoided, and a beautifying effect is achieved.

The front frame 30, the rear frame 40 and the supporting beam of the bottom frame 10 are foldable in the side direction (namely in the direction of a connecting line between the two side frames) so that the front frame 30 and the rear frame 40 can be folded to be stored.

Furthermore, the supporting beam is a cross beam comprising a first cross beam part 121 and a second cross beam part 122 which are pivoted to two ends of a cross beam limiting part 123, wherein the first cross beam part 121 and the second cross beam part 122 can be folded downwards relative to the cross beam limiting part 123 or be limited upwards to form the linear cross beam, and a tail end of the first cross beam part 121 and a tail end of the second cross beam part 122 are separately pivoted to the longitudinal beam limiting parts 113 of the two longitudinal beams.

Furthermore, the cross beam limiting part 123 is provided with a U-shaped groove, wherein the U-shaped groove comprises a front opening and side openings, the front opening of the U-shaped groove faces downwards, and the first cross beam part and the second cross beam part are inserted into the U-shaped groove from the side openings so as to be pivoted together.

Figure 2:
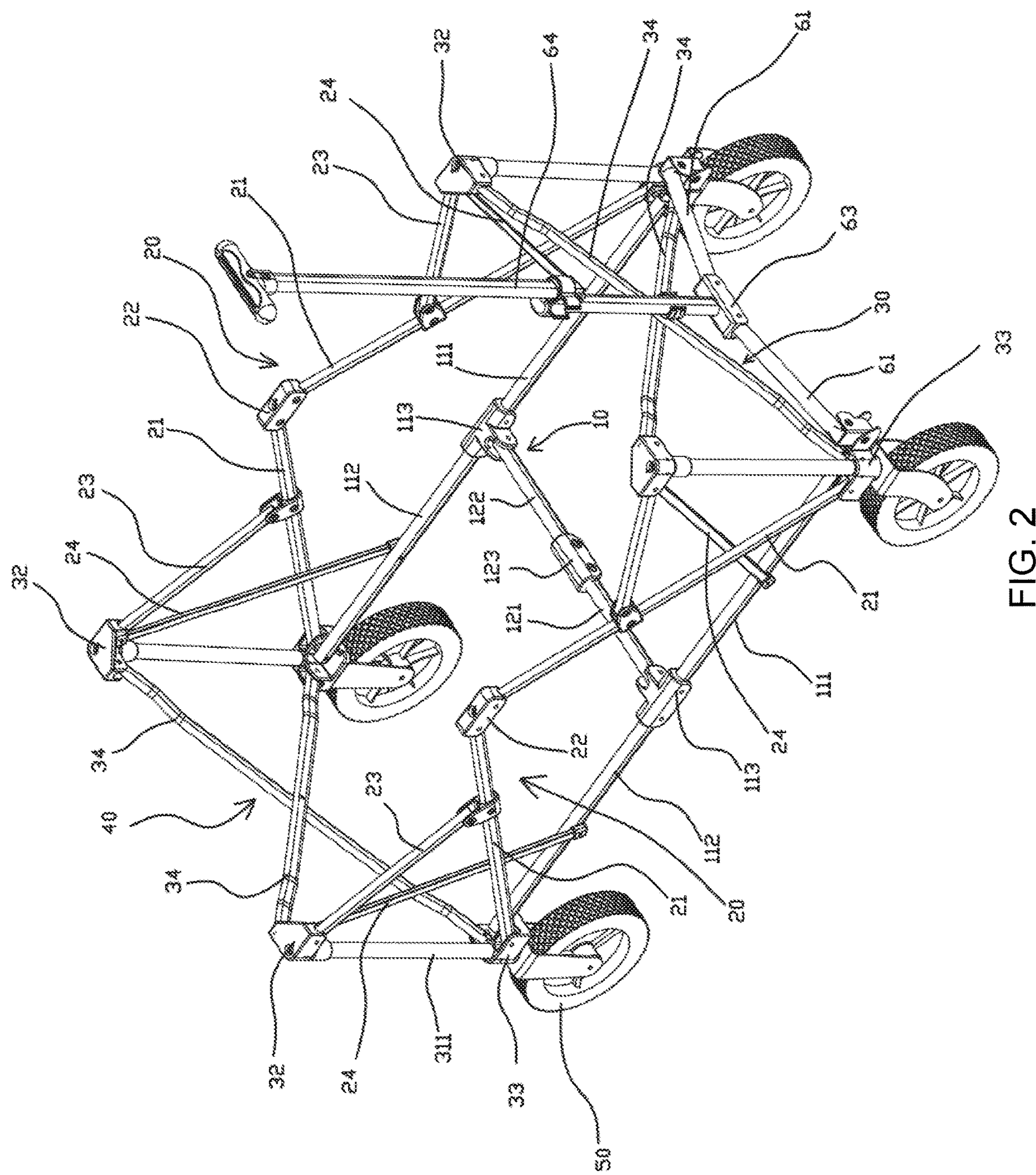
FIG. 2 is a second perspective view of the foldable handcart in the unfolded state of the embodiment.
Figure 3:
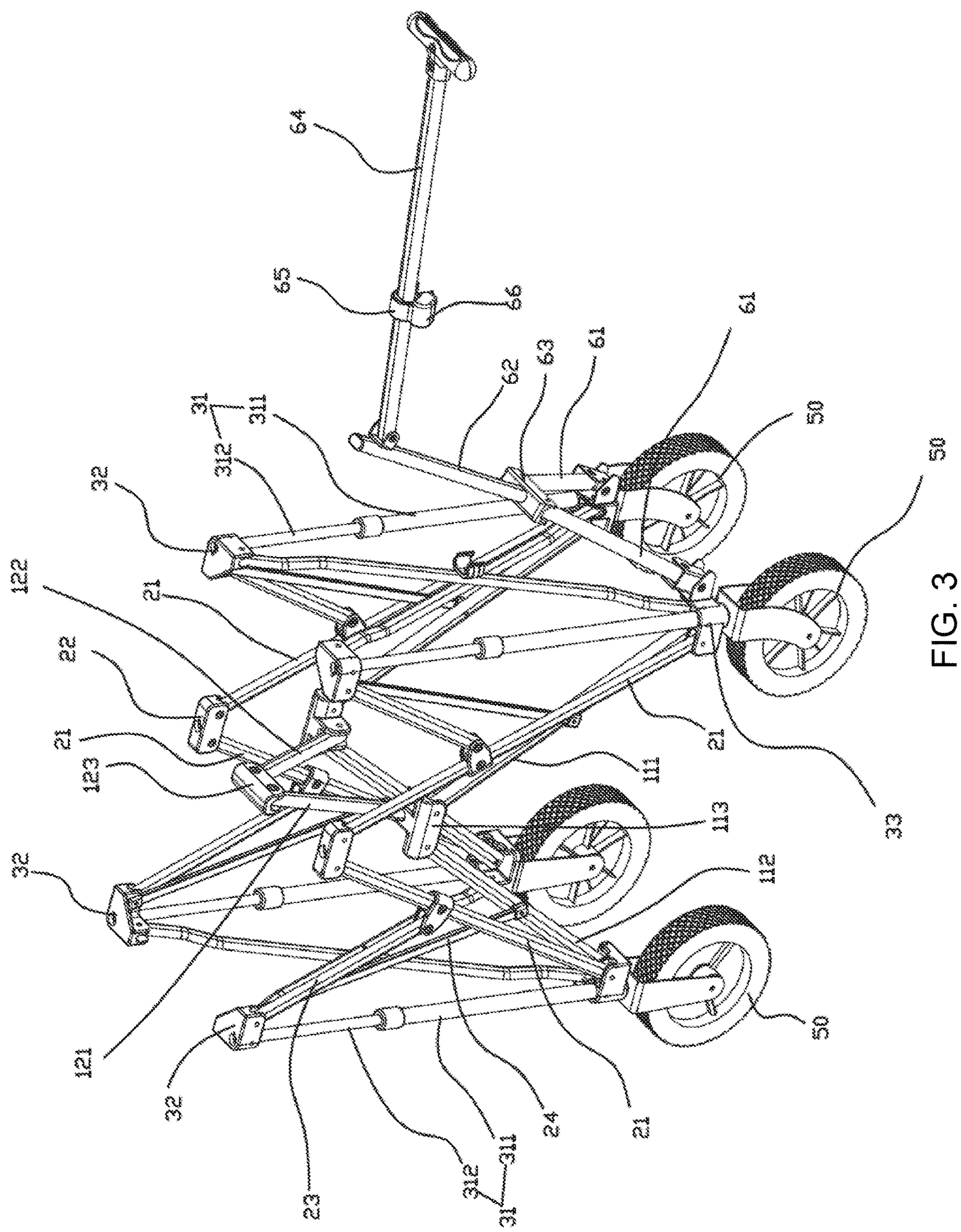
FIG. 3 is a perspective view of the foldable handcart in the storing or unfolding process of the embodiment.
Figure 4:
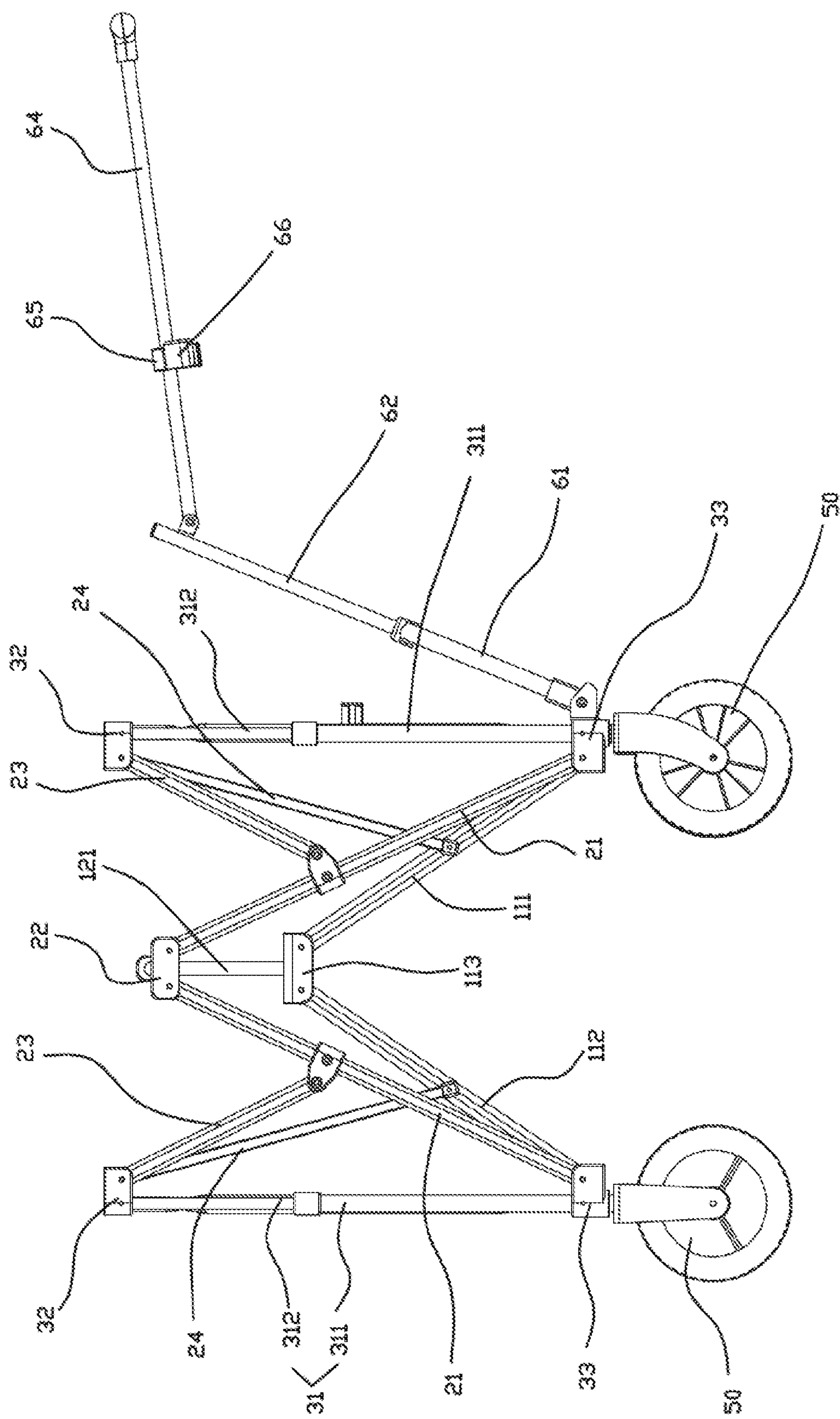
FIG. 4 is a side view of the foldable handcart in the storing or unfolding process of the embodiment.
Figure 5:
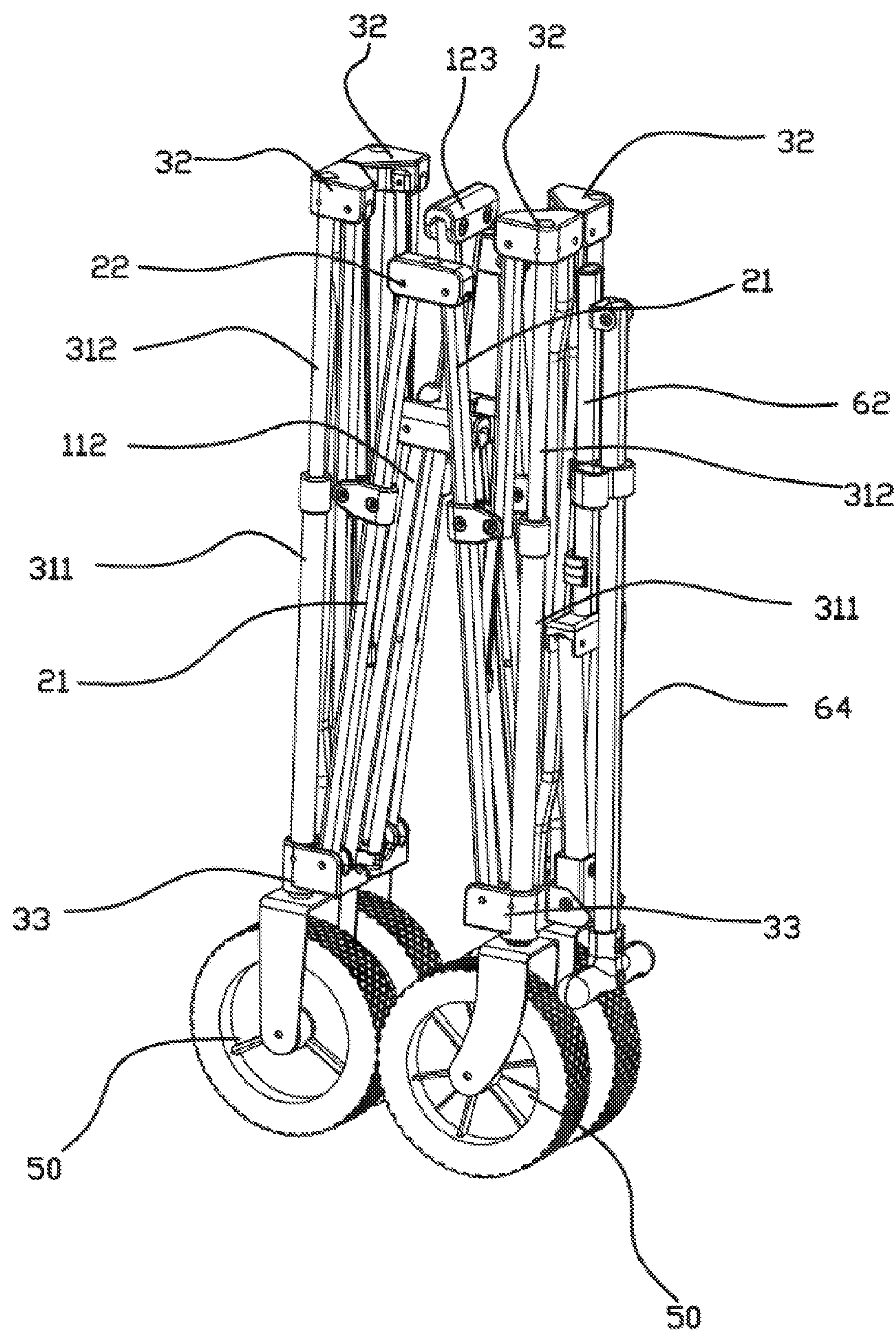
FIG. 5 is a perspective view of the foldable handcart in the stored state of the embodiment.

The front frame 30 and the rear frame 40 are symmetrical to each other and each comprise two spaced upright columns 31 and a telescopic connecting frame arranged between the two upright columns 31, wherein the upright columns of the front frame 30 are in one-to-one correspondence with the upright columns of the rear frame 40, and the two side frames 20 and the two longitudinal beams of the bottom frame 10 are separately pivoted to the corresponding upright columns 31 of the front frame 30 and the rear frame 40, as shown in FIG. 1 and FIG. 2.

Each telescopic connecting frame is in an X-shape telescopic frame and comprises two second oblique beams 34, wherein the middles of the two second oblique beams 34 pivoted together. The upright columns 31 are of a telescopic structure. The four ends of each X-shaped telescopic frame are separately connected to the upper ends and the lower ends of the two upright columns 31 of the front frame 30 or the rear frame 40. Of course, in other embodiments, the telescopic connecting frames are able to stretch out or retreat in only one direction (namely the horizontal direction in this embodiment), and in this case, the upright columns do not need to be of the telescopic structure.

Furthermore, when the foldable handcart is in the unfolded state, the upright columns 31 retreat to the lower limit positions, and at this moment, the upper ends of the upright columns 31 are flush with the first connecting pieces 22, so that the force borne by the foldable handcart is balanced when the foldable handcart is sleeved with the cloth bag. Of course, in other embodiments, the upper ends of the upright columns 31 may not be flush with the first connecting pieces 22.

Particularly, each upright column 31 comprises a supporting tube 311 and a telescopic tube 312 telescopically arranged in the supporting tube 311 in a sleeved manner, wherein the lower end of the supporting tube 311 is the lower end of the upright column 31, and the upper end of the telescopic tube 312 is the upper end of the upright column 31; and a lower connector 33 is connected to the lower end of the supporting tube 311, and an upper connector 32 is connected to the upper end of the telescopic tube 312. The upright columns are correspondingly connected with the telescopic connecting frames, the side frames 20 and the bottom frame 10 through the upper connectors 32 and the lower connectors 33. For instance, the upper ends of the X-shaped telescopic frames are pivoted to the upper connectors 32 at the upper ends of the upright columns 31. The lower ends of the X-shaped telescopic frames, the longitudinal beams of the bottom frame 10 and the first oblique beams 21 of the side frames 20 are pivoted to the lower connectors 33.

Furthermore, each side frame 20 further comprises two oblique connecting beams 23, wherein the two oblique connecting beams 23 are connected between one upper connector 32 of the front frame 30 and the corresponding first oblique first oblique beam 21 as well as between one upper connector 32 of the rear frame 40 and the corresponding first oblique beam 21, so that a triangular supporting structure is formed by the upright columns 31, the oblique connecting beams 23 and the first oblique beams 21 to reinforce the front frame 30, the rear frame 40 and the side frames 20, and accordingly, the side frames 20 are prevented from inclining in the side direction, and the front frame 30 or the rear frame 40 is prevented from inclining in the front-back direction. The oblique connecting beams 23 are connected with the upper connectors 32 and are able to move when the foldable handcart is folded to be stored thanks to the telescopic structure of the upright columns 31. Of course, in other embodiments, the supporting tube 311 of each upright column 31 can be sleeved with a sliding sleeve capable of sliding upwards or downwards along the supporting tube 311, and the oblique connecting beams 23 are connected to the sliding sleeves.

Furthermore, each side frame 20 further comprises two linkage beams 24, wherein the two linkage beams 24 are connected between the front longitudinal beam part 111 of the side frame and the upper connector 32 at the upper ends of one upright columns 31 of the front frame 30 as well as between the rear longitudinal beam part 112 of the side frame and the upper connectors 32 at the upper end of one upright column 31 of the rear frame 40, so that the longitudinal beams are linked with the front beam 30 and the rear frame 40.

Particularly, in this embodiment, the supporting frame is a foldable cross beam so that the structure is simple. Of course, in other embodiments, the supporting frame can be a foldable X-shaped structure in the comparative document (Beach Cart disclosed by Chinese Invention Patent Application No. CN201210572499.4) mentioned in the background, or the like.

In this embodiment, the front frame 30, the rear frame 40 and the supporting beam of the bottom frame 10 are foldable in the side direction (namely the direction of the connecting line of the two side frames) so that the front frame 30 and the rear frame 40 can be folded to be stored, and accordingly, the foldable handcart can be folded in all directions and has a smaller size when stored. Of course, in other embodiments, the front frame 30, the rear frame 40 and the supporting beam of the bottom frame 10 can be of a fixed structure which cannot be folded, for instance, by directly arranging a partition plate between the two upright columns 31 of the front frame 30 or the rear frame 40, or by using a single rigid crossbeam as the supporting beam, or by using two fixed X-shaped beams connected between the two front longitudinal beam parts of the two side frames as well as between the two rear longitudinal beam parts of the two side frames as the supporting beam, under the condition that the front longitudinal beam parts and the rear longitudinal beam parts of the longitudinal beams can be folded without being affected.

Furthermore, in this embodiment, the cross beam and the longitudinal beams of the bottom frame 10, the first oblique beams 21 and the oblique connecting beams 23 of the side frames 20, and the second oblique beams 34 of the front frame 30 and the rear frame 40 are all of a tube structure, thereby being low in weight. Of course, in other embodiments, these components can be of a rod structure, or part of these components are of a rod structure, and the other part of these components are of a tube structure.

The four wheels 50 are separately arranged on the four lower connectors 33 of the front frame 30 and the rear frame 40. The handlebar comprises a connecting frame pivoted to the two lower connectors 33 of the front frame 30 and a handle 64 pivoted to the connecting frame, wherein the connecting frame is of an inverted-Y-shaped structure and comprises two oblique tubes 61, a vertical tube 62 and a second connecting piece 63, first ends of the two oblique tubes 61 are pivoted to the second connecting piece 63, and second ends of the two oblique tubes 61 are separately pivoted to the two lower connectors 33 of the front frame 30; a first end of the vertical tube 62 is fixed to the second connecting piece 63, and the handle 64 is pivoted to a position close to a second end of the vertical tube 62. The handle 64 is slidably sleeved with a sliding sleeve 65. A cap 66 is integrally formed on the sliding sleeve 65. When the handle 64 swings to be parallel with the vertical tube 62, the cap 66 covers the second end of the vertical tube 62 so as to fix the handlebar.

Furthermore, a C-shaped sleeve 67 is arranged in the middle of the X-shaped telescopic frame of the front frame 30. When the connecting frame swings to be vertical, the vertical tube 62 is fixedly arranged on the C-shaped sleeve 67 in a sleeved manner, and thus, the position of the handlebar is fixed.

When the handcart is folded to be stored, the cross beam of the bottom frame 10 is lifted to be folded, the side frames 20 on the two sides are driven to draw close to each other at the same time, and thus, the front frame 30 and the rear frame 40 are folded; meanwhile, when the cross beam is lifted, the longitudinal beams are synchronously driven to be folded, then the front frame 30 and the rear frame 40 are driven to draw close to each other, the side frames 20 on the two sides are folded accordingly, and in this way, the handcart frame is folded to be stored; and when the handlebar is stored, the sliding sleeve 65 on the handle 64 is slid upwards to separate the cap 66 from the second end of the vertical tube 62, then the handle 64 is folded, and in this way, the whole handcart is folded.

Furthermore, the linkage beams 24 are arranged between the longitudinal beams and the upper ends of the upright columns 31, and when the longitudinal beams are folded, the upright columns 31 are driven by the linkage beams 24 to stretch, then the X-shaped telescopic frames are driven to retreat, and thus, the whole foldable handcart has better stretching/retreating linkage and can be folded or unfolded more smoothly.

When the foldable handcart is used, the lower cross beam is pressed to be unfolded, then the side frames 20 on the two sides move away from each other, and the front frame 30 and the rear frame 40 are unfolded; at the same time, the longitudinal beams are synchronously unfolded to drive the front frame 30 and the rear frame 40 to be away from each other, and thus, the side frames 20 on the two sides are unfolded; and when the handlebar is unfolded, the handle 64 swings to be parallel with the vertical tube 62, the sliding sleeve 65 is slid till the second end of the vertical tube 62 is covered with the cap 66, and thus, the handlebar is fixed.

Although the invention is specifically illustrated and explained with preferred embodiments, those skilled in this field should understand that various modifications can be made in form and in detail without deviating from the spirit and scope defined by the claims of the invention, and all these modifications should also fall within the protection scope of the invention.

What is claimed is:

1. A foldable handcart, comprising a handcart frame and wheels arranged at a bottom of the handcart frame, wherein the handcart frame comprises a bottom frame, a front frame, a rear frame and side frames located on two sides;

the bottom frame comprises two longitudinal beams and a supporting beam arranged between the two longitudinal beams, each said longitudinal beam has two ends separately pivoted to the front frame and the rear frame and comprises a front longitudinal beam part and a rear longitudinal beam part which are pivoted to two ends of a longitudinal beam limiting part, each said front longitudinal beam part and the corresponding rear longitudinal beam part can be folded downwards relative to the corresponding longitudinal beam limiting part or be limited upwards to form one said linear longitudinal beam;

each said side frame comprises two first oblique beams, wherein first ends of the two first oblique beams are pivoted together, and second ends of the two first oblique beams are separately pivoted to the front frame and the rear frame; the two longitudinal beams of the bottom frame correspond to the two side frames; and in an unfolded state, each said front longitudinal beam part and the corresponding rear longitudinal beam part form one said linear longitudinal beam and form a triangular supporting structure together with the two first oblique beams of the corresponding side frame;

wherein the front frame, the rear frame and the supporting beam of the bottom frame are foldable in a side direction; and wherein the first supporting beam is a cross beam, the cross beam comprises a first cross beam part and a second cross beam part which are pivoted to two ends of a cross beam limiting part, the first cross beam part and the second cross beam part can be folded downwards relative to the cross beam limiting part or be limited upwards to form the linear cross beam, and a tail end of the first cross beam part and a tail end of the second cross beam part are separately pivoted to the longitudinal beam limiting parts of the two longitudinal beams.

2. The foldable handcart according to claim 1, wherein each said longitudinal beam limiting part is provided with a U-shaped groove comprising a front opening and side openings, the front opening of each said U-shaped groove faces downwards, and the front longitudinal beam part and the rear longitudinal beam part of each said longitudinal frame are inserted into the corresponding U-shaped groove from the side openings of the U-shaped groove so as to be pivoted together.

3. The foldable handcart according to claim 1, wherein each said side frame further comprises two oblique connecting beams which are connected between the front frame and the corresponding first oblique beam as well as between the rear frame and the corresponding first oblique beam.

4. The foldable handcart according to claim 1, wherein the cross beam limiting part is provided with a U-shaped groove comprising a front opening and side openings, the front opening of the U-shaped groove faces downwards, and the first cross beam part and the second cross beam part are inserted into the U-shaped groove from the side openings so as to be pivoted together.

5. The foldable handcart according to claim 1, wherein the front frame and the rear frame each comprise two spaced upright columns and a telescopic connecting frame arranged between the two upright columns, the upright columns of the front frame are in one-to-one correspondence with the upright columns of the rear frame, and two side frames and the two longitudinal beams of the bottom frame are separately pivoted to the corresponding upright columns of the front frame and the rear frame.

6. The foldable handcart according to claim 5, wherein each said telescopic connecting frame is an X-shaped telescopic frame and comprises two second oblique beams, middles of the two second oblique beams of each said X-shaped telescopic connecting frame are pivoted together, the upright columns are of a telescopic structure, and each said X-shaped telescopic frame has four ends separately connected to upper ends and lower ends of the two upright columns of the front frame or the rear frame.

7. The foldable handcart according to claim 6, wherein each said side frame comprises two linkage beams which are connected between the corresponding longitudinal beam and the upper end of one said upright column of the front frame as well as between the corresponding longitudinal beam and the upper end of one said upright column of the rear fame.

8. The foldable handcart according to claim 5, wherein upper connectors are connected to upper ends of the upright columns, lower connectors are connected to lower ends of the upright columns, and the upright columns are correspondingly connected with the telescopic connecting frames, the side frames and the bottom frame through the upper connectors and the lower connectors.

* * * * *